United States Patent [19]

Butler et al.

[11] Patent Number: 5,016,998

[45] Date of Patent: May 21, 1991

[54] FOCUS CONTROL SYSTEM FOR STRETCHED-MEMBRANE MIRROR MODULE

[75] Inventors: Barry L. Butler, Solana Beach; Kelly J. Beninga, San Diego, both of Calif.

[73] Assignee: Science Applications International Corporation, San Diego, Calif.

[21] Appl. No.: 335,898

[22] Filed: Apr. 10, 1989

[51] Int. Cl.$^5$ .......................... G02B 5/10; G02B 7/18
[52] U.S. Cl. .................................... 350/608; 350/607
[58] Field of Search ............... 350/608, 607, 320–321, 350/417–418

[56] References Cited

U.S. PATENT DOCUMENTS 4,179,193 12/1979 Gillette et al. ...................... 350/608
4,422,723 12/1983 Williams et al. .................... 350/608
4,511,215 4/1985 Butler .................................. 350/608

OTHER PUBLICATIONS

Murphy, L. M., "Technical and Cost Benefits of Lightweight Stretched-Membrane Heliostats", SERI/-TR-253-1818, Technical Report Prepared Under Contract No. EG-77-C-01-4042, Solar Energy Research Institute, Golden, Colo. (May 1983).

Murphy, L. M., "Stretched-Membrane Heliostat Technology", J. of Solar Engineering, vol. 108, pp. 230–238 (Aug. 1986).

"Development of the Stressed Membrane Heliostat", SAND87-8180, Contractor Report, Sandia National Laboratories, Albuquerque, N.M. (Apr. 1987).

Butler et al., "Development of Stressed Membrane Heliostat Mirror Module", SAIC 86/1872, Final Report, Science Applications International Corporation (Nov. 1986).

Primary Examiner—Bruce Y. Arnold
Assistant Examiner—James Phan
Attorney, Agent, or Firm—Fitch, Even, Tabin & Flannery

[57] ABSTRACT

A focus control system dynamically sets and controls the focal length of a reflective membrane supported between a perimeter frame. A rear membrane is also supported between the perimeter frame rearward and spaced apart from a back side of the reflective membrane. The space between the membranes defines a plenum space into which a mass of gas at a first pressure is inserted. The pressure differential between the first pressure and an external pressure, such as the atmospheric pressure, causes the reflective membrane to assume a first curvature relative to a reference plane associated with the perimeter frame. This curvature defines the focal length of the reflective membrane. The focal length is dynamically controlled by changing the volume of the plenum space, thereby changing the first pressure. The system can be used to change or maintain the pressure differential and hence the front membrane curvature. The plenum volume is changed by pushing or pulling on a central section of the rear membrane using a suitable actuator. Sensing means continuously sense the location of the reflective membrane relative to the reference plane. This sensed position is compared to a reference position, and a resulting error signal, comprising the difference between the sensed position and reference position, drives the actuator in a direction to minimize the difference. A vent value compensates for temperature changes or leaks in the closed volume by allowing the pressure differential to be adjusted as required to center the working range of the actuator about the desired focal length.

20 Claims, 5 Drawing Sheets

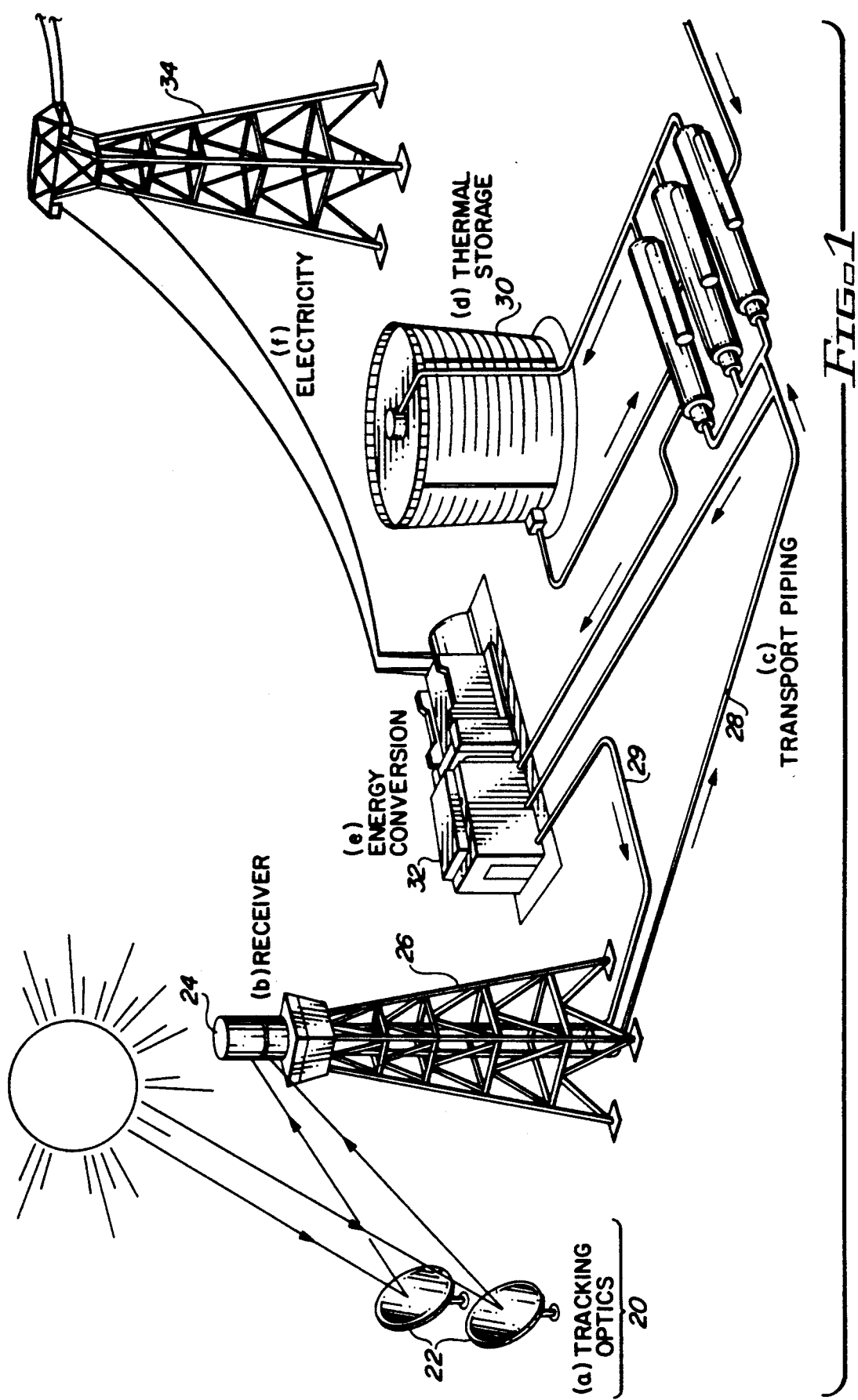

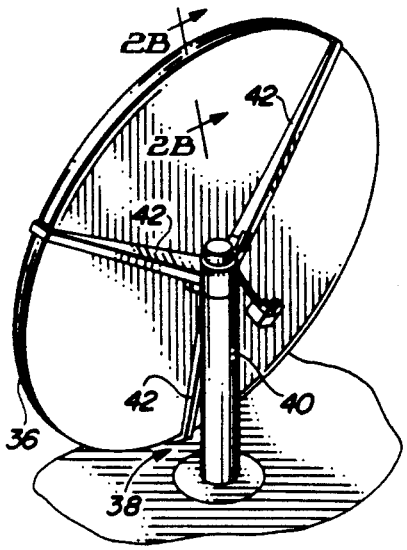
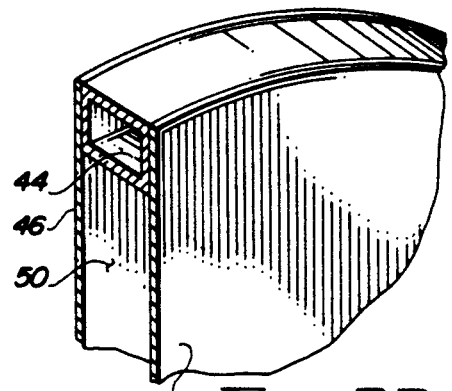
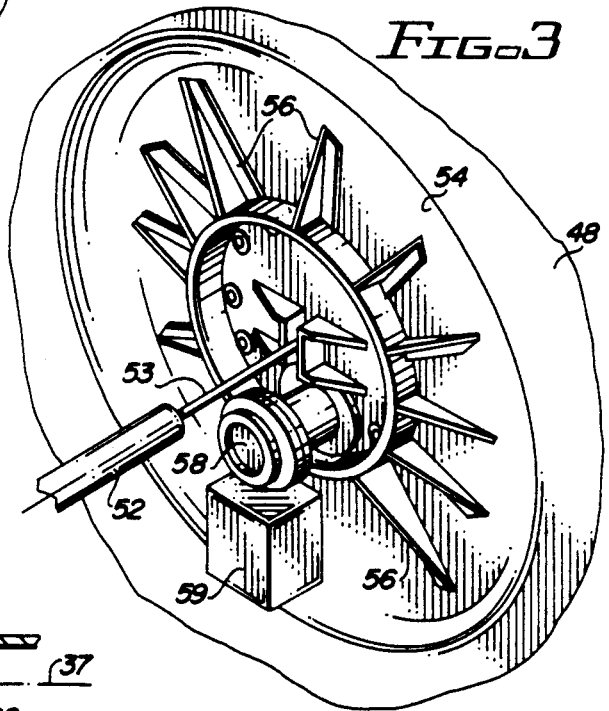
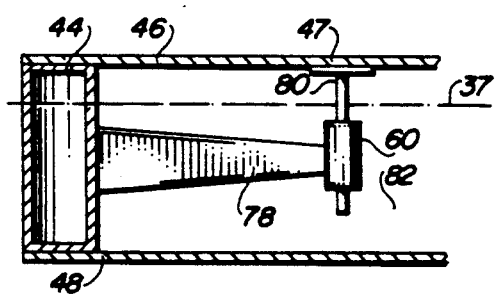
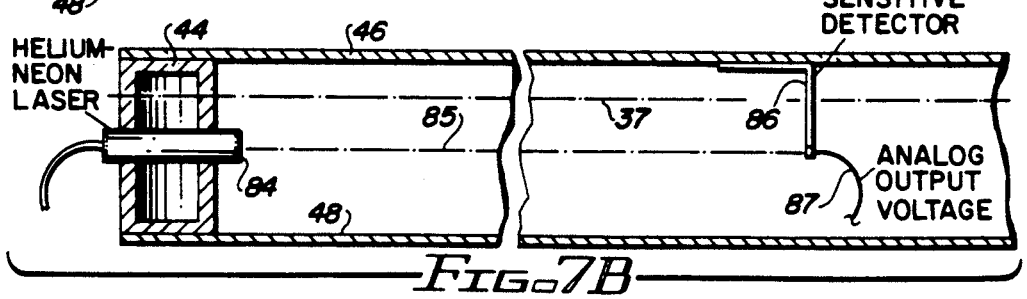

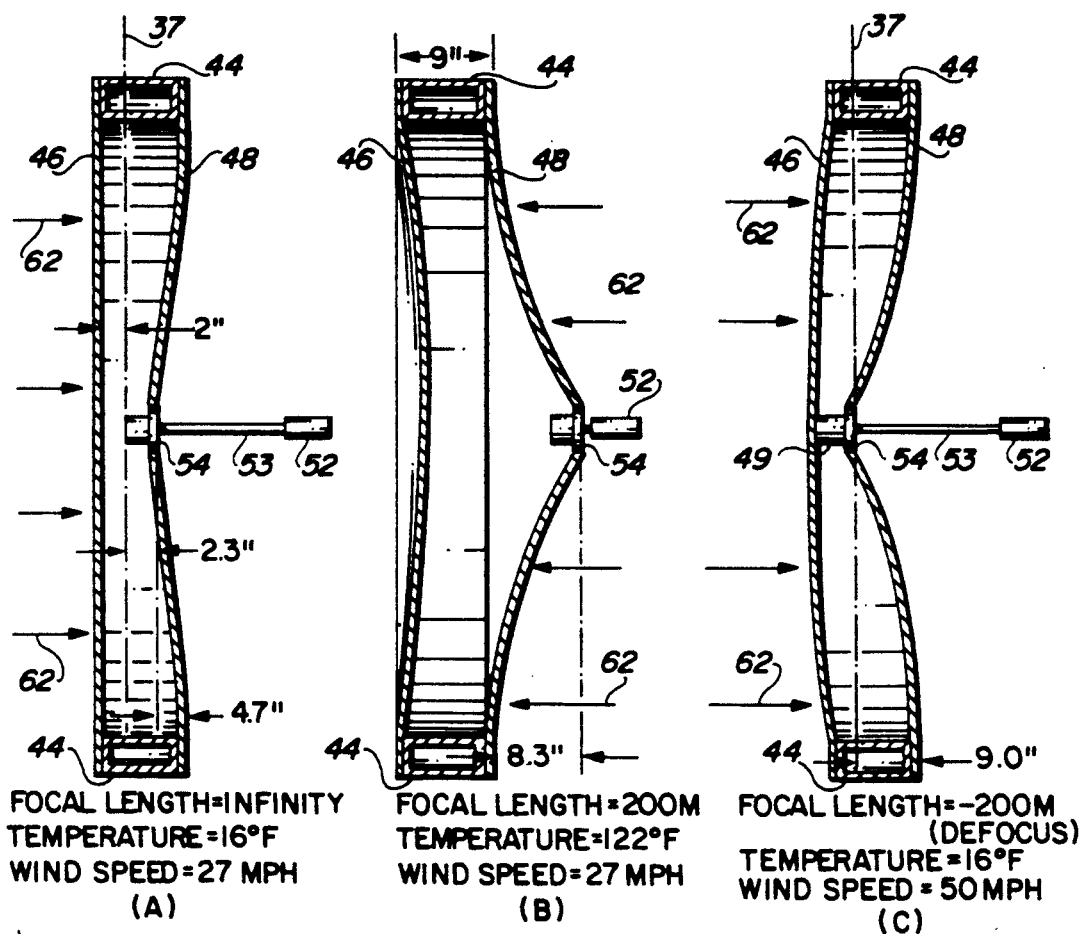
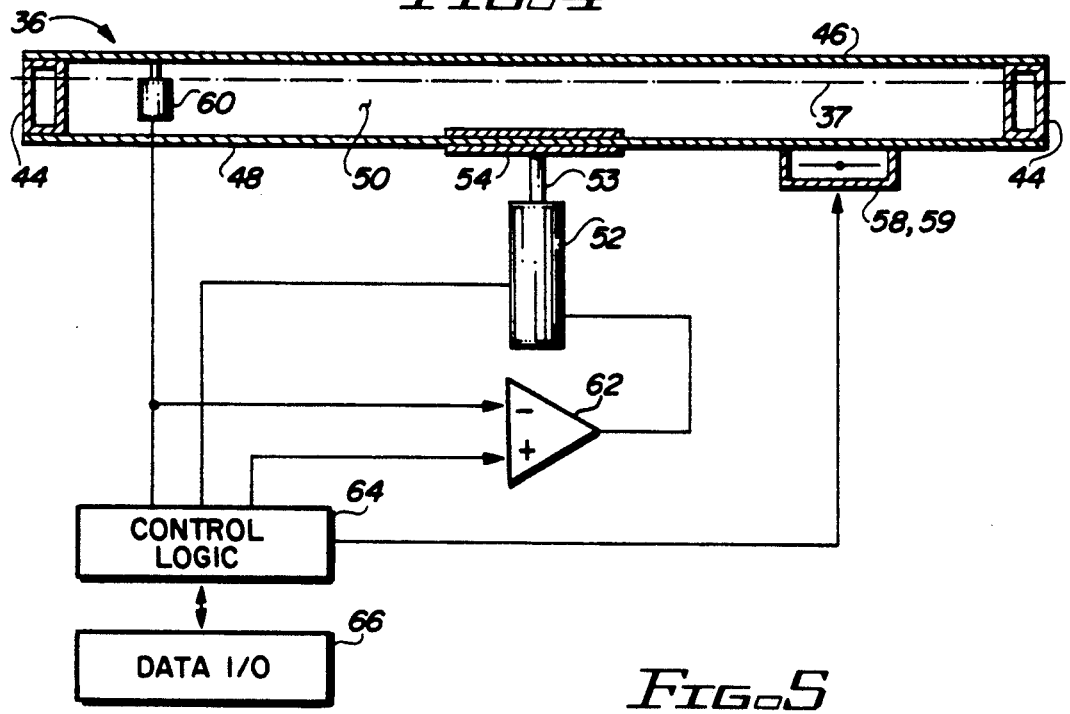

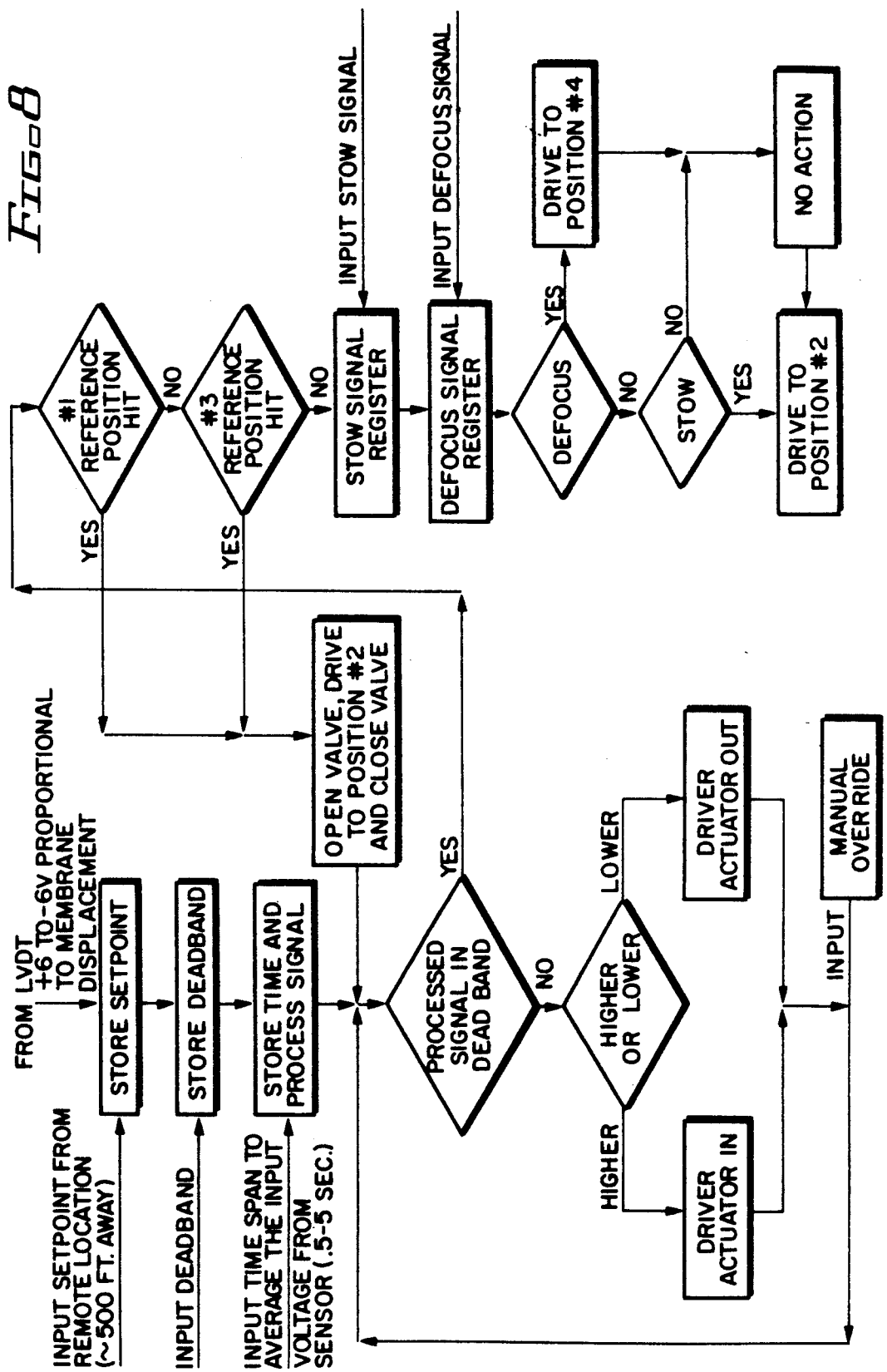

FOCUS CONTROL SYSTEM FOR STRETCHED-MEMBRANE MIRROR MODULE

The Government has rights in this invention pursuant to Contract No. DE-AC04-76DP00789 awarded by the U.S. Department of Energy; Subcontract No. 33-1226.

BACKGROUND OF THE INVENTION

The present invention relates generally to solar or other radiation energy collector/concentrator systems, and more particularly to a focus control system for use with a stretched-membrane mirror module providing for the accurate and rapid focusing or defocusing of incident radiation.

Because of the virtually unlimited supply of energy of the sun and its availability, the conversion of solar radiation into other, more usable forms of energy has long been the subject of serious study and analysis. However, because solar energy is so diffuse, it must first be collected before it can be converted to more usable forms of energy. One technique for collecting solar energy involves a solar central receiver system. Such a system utilizes a large field of mirrors to reflect the sun's energy onto a receiver that is placed at an accessible location, such as on a tower proximate the field of mirrors. The receiver is illuminated with concentrated sunlight to a high temperature, e.g. 565° C., and steam is produced to drive a turbine generator to make electricity. In addition to generating heat for the purpose of generating electricity, the concentrated solar energy can also be used to detoxify waste, or to generate electricity directly with the use of a photovoltaic receiver panel.

The mirrors used in a central receiver system are mounted on a special fixture that directs the reflected image of the sun to the receiver location. Such a mirror/fixture combination is referred to as a heliostat, where the term "helio-stat" means "sun-constant." It is thus the function of the heliostat to position the sun's reflected image on the receiver as the sun moves throughout the day, which receiver is at a fixed location relative to the heliostat.

Early heliostats used glass or metal mirrors that were either small and flat, or slightly concave, and mounted on a tracking mechanism designed to maintain the sun's reflected image on the receiving tower. Because such tracking systems are expensive, it was evident that larger reflector surfaces should be employed in order to collect more energy per each tracking system used. Hence, the heliostat size increased by adding more and larger mirror facets, and truss support structure became heavy in order to limit gravity and wind load deflections. Unfortunately, the increased weight associated with these larger heliostats introduced new problems that had to be addressed if such systems were to be efficiently and cost effectively fabricated and operated. In particular, the size of the support structure needed to maintain the heavier mirror surfaces at a desired orientation, particularly in the presence of other environmental forces, such as wind, rendered very large mirror surfaces impractical. Further, the response time of such metal/glass heliostats, i.e., the time required to remove the sun's image from the receiver location, became unacceptably long, because the tracking system had to move the mirror surface so the sun's image would miss the receiver tower.

A significant advance in the heliostat art occurred with the development of light-weight heliostats employing reflective surfaces mounted on stretched membranes, as taught for example in U.S. Pat. No. 4,511,215. The stretched-membrane concept was radically different from the glass/metal designs in that the mirror module consisted of two thin membranes (metal preferred) stretched over either side of a large-diameter ring (metal preferred). The reflective surface was laminated onto the front membrane. A force was applied to the front membrane to cause focusing by mechanical means or differential pressure. The pressure in the space between the two membranes, referred to as the plenum pressure, was actively controlled by inflating it, using blowers and/or pumps and valves, to provide a concave or parabolic shape to the reflective surface for focusing. The plenum pressure could also be changed through inflation to defocus the mirror for safety procedures.

Unfortunately, the light-weight stretched-membrane mirror module is subject to fluctuations in position from the effects of blowing and gusting winds. Therefore, the focus control system used with such lightweight mirror modules must not only initially set the proper focal length for the mirror by setting the pressure differential across it, but must also compensate for external pressure changes on the front membrane by adjusting the internal plenum pressure, to keep the pressure differential constant.

The known focus systems used with prior stretched-membrane mirror modules consist of a method of plenum evacuation in which the mass of air located in the plenum is increased or decreased to focus or defocus the mirror. Such plenum evacuation is performed using a pump or fan to move large volumes of air. Disadvantageously, the response time of such evacuation focus control systems remains unacceptably long compared to the sudden gusts or changes of wind that may occur, or compared to the rapid defocus time that may be needed for safety reasons. What is needed therefore, is a focus control system for a stretched-membrane mirror module system that can rapidly and accurately change the plenum pressure so as to achieve a desired change in the focal length of the mirror. The present invention advantageously addresses this and other needs.

SUMMARY OF THE INVENTION

The present invention relates to a method and system for setting and dynamically controlling the optical focal length of mirrors used for reflection and concentration of solar or other radiative energy. The mirrors used with the present invention comprise stretched-membrane mirror modules. Such stretched-membrane mirror modules include two thin membranes stretched over either side of a large diameter metal ring or other perimeter frame. The reflective surface is a silver polymer film or other suitable glass or thin film reflector laminated on the front membrane. The pressure in the space between the two membranes, the plenum pressure, is actively controlled to provide a parabolic/spherical shape to the reflective surface. The plenum pressure can be quickly changed to defocus the mirror for safety procedures. The radius of curvature of the reflecting membrane R is porportional to the difference between the pressure on the front side and back side (differential pressure) of the membrane. If no pressure difference exists, it is flat. If the pressure is higher on the front, it is focussed (concave), and if the pressure is higher on the back it is convex.

The focus control system of the present invention sets the pressure difference across the front membrane, then keeps it constant. Control of the plenum pressure is maintained by axially modulating the rear membrane with a mechanical positioning device. The theory upon which this system is based is that an increase in plenum volume with a constant air mass results in a decrease in plenum pressure, and a decrease in plenum volume with a constant air mass results in an increase in plenum pressure. A position detector mounted inside the plenum senses the position of the front membrane. The front membrane position is monitored by a microprocessor-based control system, or equivalent, which controls an actuator attached to the center of the rear membrane. The actuator moves the rear membrane to increase or decrease the plenum volume until the front membrane position is at a desired location.

Advantageously, the rear membrane modulation approach used by the present invention provides a significantly improved response time over prior art focus control systems. This is because with the present invention it is unnecessary to displace large amounts of air (or other fluid placed in the space between the membranes). Further, prior art systems which rely upon plenum evacuation tend to overshoot the focus point and are unable to respond to rapidly changing wind loads. In contrast, the rear membrane modulation system of the present invention can quickly and accurately respond to any wind loading condition. Hence, while focusing methods that rely on plenum evacuation produce a reflected image that varies greatly according to the wind conditions, the present invention advantageously produces an image that is virtually unaltered by transient wind conditions.

Moreover, in the event of a total loss of power, prior art systems are unable to produce a defocus condition very rapidly inasmuch as large volumes of air must be moved under power loss conditions. The focus system of the present invention, on the other hand, which may advantageously include a small battery backup power system, can defocus the mirror module in a very short time, e.g., in about three seconds.

The present invention may thus be summarized as a focus control system that dynamically controls the focal point or focal length of a reflective membrane supported between a perimeter frame. A rear membrane is also supported between the perimeter frame rearward and spaced apart from a back side of the reflective membrane. The space between the membranes, or plenum, defines a closed volume into which a suitable fluid, such as a mass of gas, e.g., air, is inserted. The fluid fills the closed volume and exhibits a first pressure. The pressure differential between the first pressure and an external pressure, such as the atmospheric pressure, causes the reflective membrane to assume a first curvature relative to a reference plane oriented relative to the perimeter frame. This curvature defines the focal point or focal length of the reflective membrane. The focal length is dynamically controlled by changing the size of the closed volume, thereby changing the first pressure, and hence controlling the pressure differential. The closed volume is changed by axially pushing or pulling on a central section of the rear membrane using a linear actuator, or equivalent device that produces the desired axial motion. Sensing means continuously sense the position of the reflective membrane relative to the reference plane. This sensed position is compared to a reference position, and a resulting error signal, comprising the difference between the sensed position and reference position, drives the linear actuator in a direction to minimize the difference. A vent valve advantageously compensates for leaks in the closed volume by allowing the pressure differential to be adjusted as required in order to allow the working range of the linear actuator about the desired focal point.

One embodiment of the present invention may be characterized as an apparatus for focusing a stretched-membrane mirror module. The mirror module includes spaced apart membranes stretched between a perimeter support so as to define a plenum space therebetween. The perimeter support lies in a reference plane, and a first of the membranes has a reflective coating thereon that reflects solar or other radiant energy incident thereon to a focal point determined by the curvature of the first membrane relative to the reference plane. The focusing apparatus includes: (1) means for inserting a mass of a suitable fluid, such as air, in the plenum volume, this mass of fluid assuming a first pressure, this first pressure causing the first membrane to assume a first curvature relative to the reference plane when in equilibrium with atmospheric pressure; and (2) means for controllably changing the volume of the plenum space. The changed plenum volume causes the first pressure to change to a second pressure, and the second pressure causes the first membrane to alter its curvature relative to the reference plane when in equilibrium with the atmospheric pressure, thereby causing the focal length of the first membrane to change. (As used herein, the term fluid is used to mean a substance that flows or conforms to the outline of its container. For most applications involving mirror modules used in large heliostats, this fluid will typically be a gas, such as air. However, it is to be understood that other forms of a fluid, such as a liquid, might be suitable for other applications of the invention, e.g., focusing an underwater mirror module used to focus sonic or other waves.)

Another embodiment of the invention may be characterized as focusing apparatus that includes: (1) first and second spaced apart membranes supported between a perimeter frame, the space between these membranes and frame comprising a closed volume, such closed volume having a mass of a fluid therein, such as a gas, at a first pressure, the first membrane being coated with a reflective coating, and the first membrane assuming a first curvature relative to a reference plane oriented relative to the perimeter frame as a function of the pressure differential between the first pressure and a second pressure external to the closed volume; and (2) means for controllably moving the second membrane intermediate the perimeter frame in a direction substantially perpendicular to the reference plane, this movement causing the closed volume to change, the changed closed volume altering the pressure differential between the first and second pressures, and the altered pressure differential changing the curvature of the first membrane, thereby changing the focal point of the reflective coating of the first membrane.

The invention also contemplates a method of focusing a stretched-membrane mirror module, or similar radiation energy collector, where the module or collector includes spaced apart front and rear membranes supported between a perimeter frame oriented to a reference plane, and where the spaced apart membranes and frame define a plenum space therebetween, and further where the front membrane has a reflective coating thereon from which radiation incident thereto reflects to a focal point determined by the curvature of the front membrane relative to the reference plane. This method comprises the steps of: (a) filling the plenum space with a mass of fluid, such as air, and allowing this mass of fluid to evenly disperse through the plenum volume until a first pressure is achieved, the pressure differential between this first pressure and a pressure external to the plenum space, such as the atmospheric pressure, causing the front membrane to assume a first curvature relative to the reference plane; and (b) changing the volume of the plenum space as required in order to change the focal point, a change in the plenum volume causing the first pressure internal to the plenum space to also change, thereby altering the pressure differential, which altered pressure differential causes the curvature of the front membrane to change in a way that moves the location of the focal point. The preferred technique for changing the plenum volume is to axially move a center portion of the rear membrane using an actuator, such as a linear actuator, although it is to be understood that other techniques could also be employed in accordance with this method for effectuating a change in the plenum volume.

It is an aspect of the present invention to provide a focus control system for use with a stretched-membrane mirror module that accurately and quickly alters the plenum pressure so as to alter the curvature of the front membrane, and hence the focal length of the reflective surface formed on the front membrane.

It is another aspect of this invention that once the desired focal length has been set that the internal pressure can be varied in response to external changes (e.g., temperature and wind) to keep the set focal length constant and maintain the set pressure difference across the front membrane.

It is another aspect of the invention to provide such a focus control system wherein the change in plenum pressure is realized without requiring the movement of large amounts of air, or other fluid, into or out of the plenum space.

It is a further aspect of the invention to provide such a focus control system wherein the change in plenum pressure is quickly and accurately realized by axially modulating the rear membrane.

It is yet another aspect of the invention to provide such a focus control system that can quickly and efficiently produce a defocused condition.

It is a feature of the invention to provide a rear membrane modulated focus control system for a stretched-membrane mirror module that can readily compensate for changes in internal plenum pressure caused by leaks, and that can automatically change the plenum pressure as required in order to center the operating range of the device used to modulate the rear membrane about a desired focal length.

It is another feature of the invention to provide a rear membrane modulated focus control system for a stretched-membrane mirror module, particularly those having a large reflective surface area, wherein the focused image remains virtually unaltered even in the presence of substantial and randomly oriented transient wind forces.

BRIEF DESCRIPTION OF THE DRAWINGS

The above and other advantages, aspects and features of the present invention will be more apparent from the following more particular description thereof, presented in conjunction with the following drawings wherein:

FIG. 1 is a simplified schematic diagram illustrating the main components of a solar thermal central receiver system;

FIG. 2A is an isometric view of a heliostat utilizing a stretched-membrane mirror module;

FIG. 2B is an expanded cutaway view of a perimeter portion of the mirror module of FIG. 2A, and illustrates the front and rear membranes attached to the perimeter support frame;

FIG. 3 is an isometric view of a portion of the back side of a stretched-membrane mirror module and illustrates the manner in which a linear actuator is attached to a plate fastened to the rear membrane, this linear actuator being used for the purpose of axially modulating its position;

FIG. 4 schematically illustrates, in views (A) through (C), representative positions of the rear membrane of a stretched-membrane mirror module as the rear membrane is modulated;

FIG. 5 is a simplified block diagram of the focus control system of the present invention;

FIG. 7A depicts a preferred linear variable differential transformer (LVDT) used to sense the position of the front membrane relative to the supporting frame;

FIG. 7B depicts an alternative position-transducer;

FIG. 8 is a flow chart depicting the operation of the control logic of FIG. 5 or the control board of FIG. 6;

DETAILED DESCRIPTION OF THE INVENTION

Figure 6:
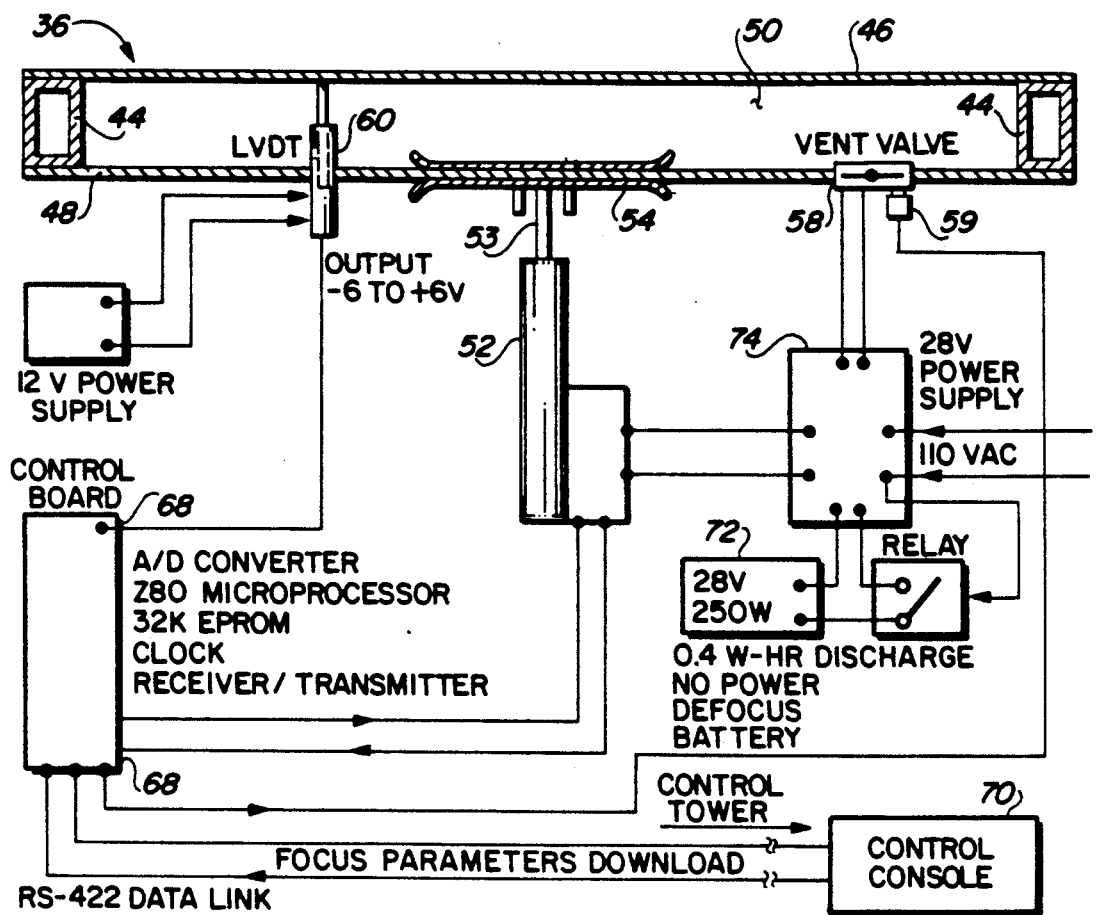
FIG. 6 is a more detailed block diagram of one embodiment of the focus control system of the present invention, and further illustrates a battery backup subsystem used to automatically defocus the mirror module in the event of a power failure.

The following description is of the best presently contemplated mode of practicing the invention. This description is not to be taken in a limiting sense but is made merely for the purpose of describing the general principles of the invention. Like numerals refer to like parts or elements throughout this description. Further, while the description that follows describes a focus control system adapted for use with a stretched-membrane mirror module used as part of a heliostat, it is to be understood that the invention may also be used for other applications requiring the focusing of reflected energy, including sound waves, radio waves, and light waves, from a stretched-membrane reflective surface.

As further background to the present invention, and to better appreciate and understand the function of a heliostat, which is just one of the applications for the invention, reference is made to FIG. 1 where a schematic diagram of a typical solar thermal central receiver system is shown. The main components of such a system include a heliostat field 20, a receiver 24, transport piping 28 and 29, thermal storage tanks 30, an energy conversion station 32, and an electrical power distribution network 34. Energy from the sun is focused on the receiver 24 by a plurality of heliostats 22. The receiver 24 is positioned high on a tower 26, facilitating the focusing of radiant energy thereon. Water (or other suitable heat transfer medium) is heated in the receiver 24 and converted to steam. This steam is transported to the energy conversion station 32 through piping 28, where it is used to generate electricity in conventional manner. The electricity is distributed over an electrical distribution network 34. Excess steam, converted back to hot water, is held in thermal storage tanks 30. Cooled water returns to the receiver 24 through piping 29, where it is again heated by the solar energy, repeating the above process.

Included as part of the heliostats 22 is a tracking system that tracks the sun as it moves across the sky throughout the day. This tracking system maintains the front reflective surfaces of the heliostats 22 in the proper orientation to reflect the sun's energy to the receiver 24. Further, to better concentrate the sun's energy on the receiver, and thereby more efficiently generate the high temperatures needed to create the steam used in generating electricity (or for other desired purposes), the reflective surfaces of the heliostats 22 are concaved slightly, e.g., to have a parabolic shape) so as to create a focal point of this reflected energy exactly at the receiver. The location of this focal point is determined by the amount of curvature present within the reflective surface, with a shallow curvature creating a focal point farther away from the heliostat than a deeper curvature. This is, heliostats cose to the receiver tower have shorter set point focal lengths than those far from the tower. Very slight variations in the curvature of the reflective surface translate to significant changes in the location of the focal point. Disadvantageously, a shift in the focal point of only a few feet can significantly affect the amount of heat that is transferred to the receiver. Hence, a focus system is required to assure that the focal point always resides at the receiver 24 and not a few feet in front of the receiver or a few feet behind the receiver. (In contrast, the tracking system used with the heliostat assures that the focal point is not above, below, to the left or to the right of the receiver.) Further, because wind gusts and other transient forces felt at the heliostat's reflective surface tend to alter its curvature, such a focus system must be able to respond quickly to compensate for such alterations. Advantageously, the focus system described herein is able to maintain the focal point at the receiver despite the presence of such transient forces, e.g., wind gusts, occurring at the reflective surface.

Referring next to FIGS. 2A and 2B, an isometric view of one embodiment of a stretched-membrane heliostat 22 is shown. This embodiment includes a stretched-membrane mirror module 36 supported by support structure 38. The support structure 38 preferably includes a single post 40 to which a plurality of trusses 42 are pivotally mounted. Three such trusses are shown in FIG. 2A, but it is to be understood that additional trusses could be utilized, e.g., five trusses, or other types of support and tracking systems, as needed to provide the requisite support for the mirror module 36. The mirror module 36 is supported by the support structure 38 so as to lie in a reference plane. A suitable tracking system, which does not form part of the present invention, controls the pivoting of the trusses 42 relative to the post 40, and hence the angling or placement of this reference plane and the mirror module 36, to properly direct or aim the reflected radiant energy to the desired target location.

As seen best in the cutaway view of FIG. 2B, the mirror module 36 includes a perimeter ring 44. A front membrane 46 is bonded to one side of the ring 44, and a rear or back membrane 48 is bonded to the other side. The ring may be made from any suitable rigid material, such as carbon steel that is rolled to form a boxbeam ring. The edges of the ring to which the membranes 46 and 48 are attached are electroplated with nickel and a roll resistance fusion seam weld is made to secure the membrane thereto. The membranes are made from a material that exhibits a degree of elasticity, thereby allowing the membranes to stretch and contract as the volume of the plenum space is changed. A suitable material for the membranes is stainless steel strips that are bonded together. For example, 0.003 mm thick, 24 inch wide type 304 stainless steel strips which are roll-resistance welded together, and to the perimeter of the ring 44 may be used. A silvered polymer film or other suitable surface is laminated to the front membrane 46 to form the reflective surface. The inside surfaces of the membranes 46 and 48, and the ring 44, define a space 50 into which a mass of air, or other suitable fluid (i.e., any suitable gas, or equivalent medium that uniformly disperses throughout the space 50), is placed in order to create a reference pressure. This space 50 may be referred to as the plenum space or plenum volume, and the pressure therein is referred to as the plenum pressure. The difference between the plenum pressure and the pressure external to the space 50, e.g., the atmospheric pressure, determines the curvature of the front membrane 46, and hence the focal length of the mirror formed by the reflective film laminated to the membrane 46.

The focal length of the mirror 46 is controlled through the use of a focus control system. This system detects the position of the front reflective membrane 46 and then compensates for any changes in membrane position due to wind load or other changes by adjusting the plenum pressure. The focus control system thus sets a desired focal length and maintains it at a constant set point even though outside forces (wind, temperature variations, etc.) are present. This system comprises three subsystems: (1) a plenum pressure adjustment subsystem; (2) a front membrane position measurement subsystem; and (3) an electronic control subsystem. Each of these subsystems will now be described.

The plenum pressure adjustment subsystem is isometrically shown in FIG. 3 and functionally shown in FIG. 4. A linear actuator 52 is used to move the back membrane 48 in and out in order to change the plenum pressure. An actuator arm or plunger 53 of the actuator 52 is attached to the membrane 48 through the use of an attachment plate 54. The actuator arm 53 extends out of the actuator 52, or is retracted back into the actuator 52, within a defined stroke operating range. The plate 54 is firmly secured to the center of the rear membrane 48. This attachment is accomplished by placing one plate inside the plenum space 50 against the inside surface of the rear membrane 48 and another plate against the outside surface of the membrane 48 and fastening the two plates together. The plate 54 includes a set of attachment lobes 56, substantially in the center thereof, to which one end of the actuator arm 53 is attached. A vent value 58, the purpose of which is to adjust the plenum pressure as explained below, also forms part of the plate 54. This vent valve 58 is controlled by a solenoid 59. A linear variable differential transformer (LVDT) 60, shown in FIGS. 5, 6, and 7A, senses the position of the front membrane 46 relative to the support frame or ring 44, (and hence relative to the reference plane oriented relative to the ring 44), thereby providing a measure of the front membrane focal length. The front membrane position measured by the LVDT 60 is compared to a desired position, and the difference (between the measured and desired positions) is used as an error signal to control the movement of the linear actuator 52. In turn, movement of the linear actuator changes the plenum pressure by changing the plenum volume. That is, an increase in plenum volume results in a decrease in plenum pressure. Similarly, a decrease in plenum volume results in an increase in plenum pressure. This is evident from the second form of the Ideal Gas Law:

$$P_1V_1/T_1 = P_2V_2/T_2$$

where,
P = Pressure
V = Volume
T = Temperature.

The process is assumed to be instantaneously isothermal, so that the temperature terms drop out of the equation, resulting in a simple relationship between plenum pressure and volume. A significant advantage of the plenum pressure adjustment subsystem is that rapid changes in plenum volume can be implemented in a very short time, resulting in rapid changes in plenum pressure. This fact makes the system very effective in compensating for rapid changes in wind velocity on the mirror module. Further, automatic adjustments are also made for long term (e.g., several minutes) variation in temperature.

FIG. 4 illustrates the operation of the actuator 52 as it moves the rear membrane 48 in and out relative to the support ring 44 for a few representative extreme environmental conditions in terms of wind forces and temperature. It is noted that the values shown in FIG. 4 for wind speed and temperature, as well as dimensions, are only exemplary. As has been indicated, the support ring 44 lies in or is oriented relative to a reference plane, shown in FIG. 4(A) as a dotted line 37. This reference plane is perpendicular to the plane of the figure. In FIG. 4(A), the actuator 52 has pushed the back membrane 48 inwardly, causing the front membrane to assume a zero curvature, i.e., to force the front membrane 46 to be parallel to the reference plane 37. In this position, the focal length of the mirrored surface laminated to the front membrane 46 is infinity. FIG. 4(A) also shows, as indicated by the arrows 62, the application of a wind force against the front membrane 46. The actuator 52 must push the rear membrane 48 towards the front membrane 46 in order to compensate for this frontal wind force.

In FIG. 4(B), the wind force 62 is rearward, i.e., blowing into the rear membrane 48. The actuator 52 is pulled away from the front membrane 46, thereby decreasing the plenum pressure, and allowing the curvature of the front membrane 46 to be slightly parabolic. In this position, the focal length of the mirrored surface is 200 meters for the representative values shown.

In FIG. 4(C), a defocus condition is shown wherein the curvature of the front membrane 46 is convex, relative to the reference plane 37, rather than concave. Further, this defocus condition occurs in the presence of a frontal wind force represented by the arrows 62. In the absence of such frontal wind force, the front membrane 46 would bow out from the frame 44 even further than is shown by the solid line, as suggested by the dashed, double-dotted line, for the actuator position shown.

Referring next to FIG. 5, a block diagram of one embodiment of the focus control system is shown. In this figure, the stretched-membrane mirror module 36 is schematically depicted in cross section, with the support ring 44 on each end, the front membrane 46 stretched between one side of the support ring 44, and the rear membrane 48 being stretched between the other side of the support ring. The space 50 between the front and rear membranes 46 and 48 comprises the plenum volume. The attachment plate 54 is located in the center of the rear membrane 48. The actuator arm 53 of the linear actuator 52 is fastened to the center of the plate 54. The LVDT 60 is positioned inside of the space 50 and is connected to the inside wall of the front membrane 46. It is the function of the LVDT 60 to sense the position of the front membrane 46 relative to the reference plane 37. A position signal indicating this relative position is generated by the LVDT and presented to a difference amplifier 62 or equivalent and control logic 64. It is the function of the difference amplifier 62 to compare the position signal generated by the LVDT 60 and compare it to a reference signal received from the control logic 64. This reference signal defines the front membrane position that is needed to produce a desired focal length. The difference amplifier uses this difference signal, or error signal, to drive the actuator 52 in a direction that minimizes this difference or error. In other words, the difference amplifier 62 moves the actuator 52 until the difference between the measured front membrane position and the desired front membrane position is zero (or at least within an acceptable tolerance band), i.e., until the front membrane has been moved to its desired position.

Advantageously, the reference signal presented to the difference amplifier 62 may be programmed to assume any desired value, as controlled by the control logic 64. Typically at least one such reference value defines the desired front membrane position needed to realize a specified focal length. A second reference value may be used to define a defocus focal length (a negative value). Other focal lengths may be selected for test or other purposes. Values of the reference signal may be sent to the control logic 64 from conventional data input/output (I/O) devices 66. Such devices may comprise, for example, a conventional keyboard. Similarly, values of the front membrane position, as measured by the LVDT 60, may be displayed or recorded by the I/O devices 66 in conventional manner.

The linear actuator 52 further includes, either as an integral part thereof or through the use of external limit switches, or equivalent, a means for sensing when the actuator arm 53 has moved in close proximity to the maximum desireable extended or retracted positions. When such limits are sensed, an appropriate signal is sent to the control logic indicating that the limits of the operating range of the linear actuator or structural limits of the membrane have been reached and that recalibration is needed or else the actuator will soon run out of useable stroke movement for adjusting the focal length of the mirror. Recalibration is usually accomplished by simply reducing the mass of air in the plenum space 50, typically achieved by opening the vent value 58 while extending the arm 53, and then closing the vent valve 53. In theory, such recalibration should not be needed, but in practice it is needed because of leaks that develop between the plenum space 50 and the outside environment.

Referring next to FIG. 6, another embodiment of the focus control system is illustrated. This embodiment is similar to the embodiment described above in connection with FIG. 5, but it utilizes a microprocessor-based control board 68 to perform the functions performed by the control logic 64 and the difference amplifier 62, and a personal computer 70 to perform the functions performed by the data I/O devices 66. Further, a backup battery 72 is employed to provide a no-power defocus operation, as will be explained below.

In operation, the LVDT 60 senses the position of the front membrane 46. This LVDT is powered by a 12-volt power supply and outputs a −6 to +6 volt signal proportional to the position of the front membrane 46. This signal is sent to the microprocessor-based control board 68. At the control board 68, the signal is converted to a digital signal, compared to a digital reference signal received via an RS-422 data link with the computer 70 (which computer 70 is typically located at a control tower remote from the actual mirror module location), and the desired position of the rear membrane linear actuator is determined. This is the position that is needed to reposition the front membrane at the reference position. The appropriate drive signals are then generated in order to drive the linear actuator to the position determined. This process is repeated as often as is necessary to keep the front membrane at a position that provides a desired focal length. In practice this is a continual process. That is, if the LVDT determines that the front membrane is not correctly positioned, the linear actuator is turned "on" and the rear membrane starts to move in a direction to reduce the error, while the position of the front membrane continues to be monitored. As soon as the LVDT senses that the correct position of the LVDT has been reached, the linear actuator in turned "off", thereby holding the desired position, until such time as the LVDT again senses that the front membrane position has moved from its desired position.

Still referring to FIG. 6, and similar to that described above in connection with FIG. 5, the vent valve 58 is used to periodically compensate for leaks in the mirror module 36. This is accomplished, for example, by opening the valve and fully extending the linear actuator to expel excess air in the plenum after the linear actuator has reached its full retraction position. Once the air is expelled, the vent value is closed and the linear actuator assumes normal operation.

Defocusing of the mirror module is necessary in emergency conditions in order to remove the flux (solar radiation) from the receiver 24 (FIG. 1). For example, failure of the receiver circulation pump would result in a loss of coolant to the receiver and would require a rapid removal of heat flux from the receiver in order to avoid damaging the receiver tubes. Defocusing of the stretched-membrane mirror module 36 is accomplished by extension of the linear actuator to increase the plenum pressure, which produces a negative focal length of the mirror module. It is possible, as suggested in FIG. 4(C), that if a sufficient wind load is present on the front membrane 46 of the mirror module, an inner defocus pad 49 may actually touch the back side of the front membrane 46 and push the center of the front membrane out in order to accomplish defocus.

In the event that there is a total loss of power, the linear actuator will not have line power to accomplish defocus. Therefore, a battery backup power supply 72 is advantageously included in the focus control system of FIG. 6 to accomplish such defocus. A battery is practical for this application because very little energy is required to accomplish defocus. A representative linear actuator, for example, requires a maximum of 7 amps at 28 volts for about 3 seconds to accomplish defocus. Hence, as shown in FIG. 6, a small lead-acid gel cell battery 72 is connected to a relay system 74, which relay system trips shut on loss of power. The linear actuator is driven by the power from the battery 72 until it reaches the internal mechanical limit switch. In this way, defocus is quickly achieved without use of external (line) power.

For a preferred heliostat embodiment, the mirror module 36 may have a diameter of 14 meters (45.9 ft.) and the plate 54 attached to the rear membrane 48 may have a diameter of six feet. The linear actuator 52 may be a commercially available lead-screw type of actuator of the type commonly used to position TV satellite dishes. A representative actuator that may be used for this purpose is available from Warner Electric, identified as the Electrak, Model 100. This particular actuator is used with a companion controller, also available from Warner Electric, as Model MCS-2035.

Referring next to FIGS. 7A and 7B, the front membrane position measurement subsystem of the focus control system will be described. Essentially, this subsystem comprises a transducer for measuring the position of the front membrane 46 relative to the reference plane 37. The preferred system for accomplishing this function comprises a mechanical linear variable differential transformer, or LVDT 60. This LVDT is mounted on a support arm 78 that is rigidly mounted to the support ring 44. A spring-loaded plunger piston or arm 80 is in physical contact with the front membrane 46. As the front membrane moves, the plunger moves, and the LVDT 60 produces an analog voltage on signal line 82 that is proportional to the position of the front membrane relative to the reference plane 37 (or other reference point aligned with the reference plane 37). As is evident from FIG. 7A, it is the position of a point 47 on the front membrane 46 (where the plunger makes contact with the membrane) relative to the plane 37 that is measured by the LVDT 60. The position of this point, in turn, can be used to provide an indication of the amount of curvature associated with the front membrane 46. A suitable LVDT 60 is commercially available from Trans Tek, and is identified as Model Number 353-100.

An alternative system for measuring the position of the front membrane 46 relative to the reference plane 37 is shown in FIG. 7B. This system utilizes a helium-neon laser 84 mounted to the ring support 44. The laser 84 directs a laser beam 85 to a one dimensional position sensitive detector 86, attached to the front membrane 46. The detector 86 generates an analog signal proportional to the linear position of the detector that is hit with the laser beam. This analog signal is output on signal line 87.

Other alternative systems exist that could be used to perform the function of sensing the position of the front membrane relative to the reference plane 37. Other equivalent systems could be readily be designed and fabricated by those skilled in the art. In general, for a heliostat application of the type described herein, a suitable membrane position sensing element should be light weight, rugged, accurate, drift-free, easy to calibrate, and low in power consumption.

Figure 9:
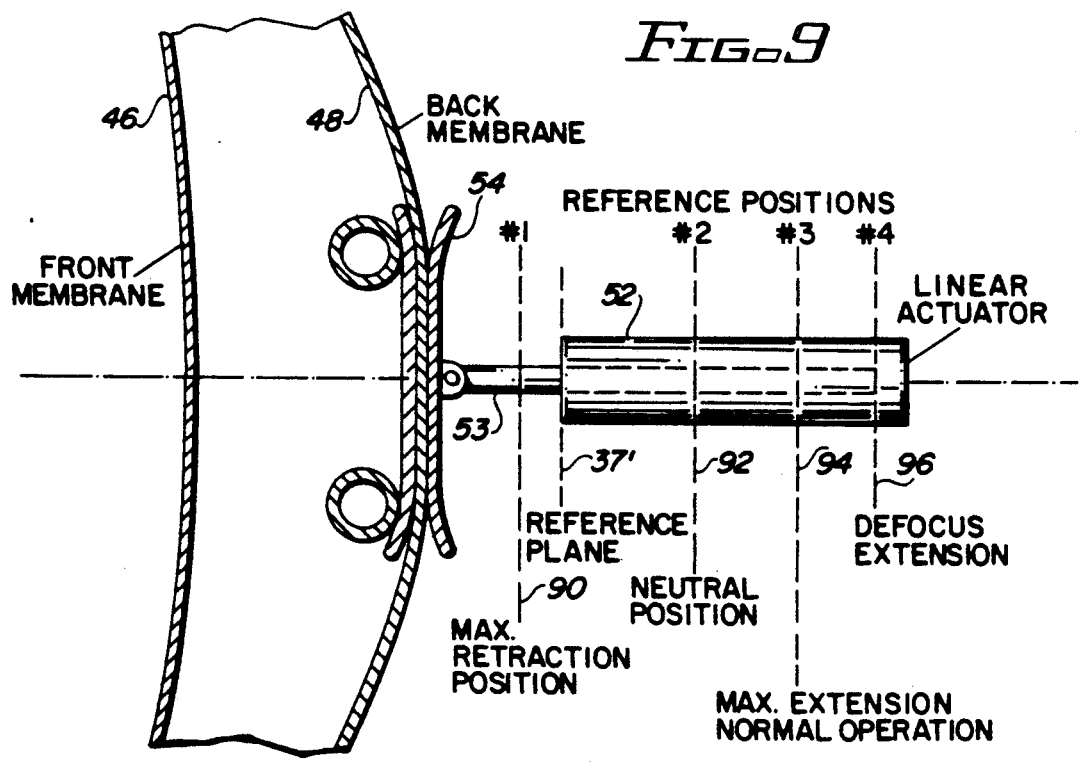
FIG. 9 is a simplified schematic diagram that illustrates the rear or back membrane of the mirror module as it is axially modulated with a linear actuator, and further defines the parameters identified in the flow chart of FIG. 8.

The electronic control subsystem of the focus control system will next be described with reference to FIGS. 6, 8 and 9. FIG. 8 is a flow chart that illustrates the preferred program carried out by the control board 68 (FIG. 6). (Alternatively, these same functions may be carried out by the control logic 64 of FIG. 5). FIG. 9 is a simplified schematic diagram of the linear actuator 52 and its coupling to the rear membrane 48, and is used to define the various positions of the actuator arm 53 that are used in controlling the operation of the focus control system. With reference to the flow diagram of FIG. 8, operation of the focus control system proceeds as follows. First, data is downloaded from the control computer 70 that define certain parameters used in operating the system. This data include: (1) the set point of the front membrane; (2) the dead band of the front membrane; (3) signal processing parameters; and (4) reference positions associated with the actuator. The set point of the front membrane is the desired position at which the monitored point on the front membrane is to be set with reference to the reference plane 37. The set point is thus the reference position referred to in the previous descriptions. The dead band is a tolerance zone or band around the set point. If the position of the front membrane 46 is within the dead band, then the controlling program takes no action to reposition the membrane, although it may take action, as described below, to adjust the plenum pressure. The output signal from the LVDT is preferably processed in an appropriate manner to filter out noise and other fast transient conditions to assure that the measurement represents an accurate indication of the position of the front membrane. Numerous processing algorithms could be used for this purpose. One of the simplest, and the one used in the preferred embodiment, is to average the LVDT output signal over a prescribed time interval. For example, as shown in FIG. 8, this averaging interval may be set anywhere between 0.5 and 5 seconds.

The reference positions associated with the actuator 52, which are also initially input to the control board 68 when the heliostat is first set up, are shown in FIG. 9. These reference positions include a reference plane 37', a maximum retraction position 90, a neutral position 92, a maximum extension normal operation position 94, and a defocus extension 96. It is noted that the retraction position 90 is referenced in FIG. 8 as the #1 reference, the neutral position 92 is referenced as the #2 reference, the normal extension position 94 is referenced as the #3 reference, and the defocus extension is referenced as the #4 reference. It is also noted that the reference plane 37' shown in FIG. 9 does not pass through the support ring 44 as does the reference plane 37 shown in the other figures. However, these two reference planes 37 and 37' are parallel to each other and for all practical purposes one or the other of the reference planes could be used by the focus control system.

Besides the above-described data that is downloaded from the computer 70, it is noted that interrupt signals may also be generated and sent to the control board 68 for defocusing and stowing of the mirror module. Stowing is essentially a standby condition where the actuator is driven to the neutral position 92.

As seen in FIG. 8, once the needed operating data is downloaded to the control board 68, a decision is made as to whether the processed signal (i.e., the output from the LVDT 60) is within the dead band. If not, a decision is made as to whether the signal is higher or lower than the set point. It lower, the actuator is driven out. If higher, the actuator is driven in. Further, a manual override signal may be received that drives the actuator to any desired signal.

If the processed signal is within the dead band, then the position of the actuator is checked to determine if the plenum pressure needs to be readjusted in order to compensate for leaks that may have occurred. This determination is made by checking first whether the actuator is at the maximum retraction position 90. If not, then a second determination is made as to whether the actuator is at the maximum extension position 94. If either of these determinations results in a "hit" (i.e., if the answer to the determination is yes), then the vent value 58 is opened, the actuator is driven to the neutral position 94, and the vent value is closed. If neither of these determinations results in a hit, then no further action is taken unless an input stow signal is received or a defocus signal is received. If a defocus signal is received, then the actuator is driven to the defocus position 96 and no further action is taken until a reset signal is received. Similarly, if a stow signal is received then the actuator is driven to the neutral position 92 and no further action is taken until a reset signal is received.

Advantageously, the control board 68 (or the control logic 64) may be completely self-contained and autonomous. As should be evident to those skilled in the art, the operation of the focus control system of the present invention is essentially that of a proportional error control system. Accordingly, any suitable software and/or hardware can be utilized to accomplish the focus constraints defined by the particular application at hand. For example, a hardware control system may be fashioned using dedicated low level logic integrated circuits, such as the 4000 CMOS series. Alternatively, a more flexible programmable software/hardware system may be fashioned using any of a wide variety of commercially available systems and components. For example, the control board 68 (FIG. 6) may be based on a Z-80 microprocessor and an EPROM (erasable programmable memory). A suitable program implementing the steps set forth in the flow chart in FIG. 8 may be prepared using any suitable programming language, such as the Turbo Pascal programming language. Once this program is prepared, tested and debugged, it can be transferred to the EPROM on the control board. Changes to the program can be made fairly simply by making changes on the control computer 70, which may be (for example) an IBM PC or compatible computer, and then reprogramming these changes into the EPROM chip. Once the operational focus parameters have been down loaded from the control computer 70 to the control board 68, the focus control system operates autonomously with no inputs required from the control computer 70. However, if desired, the control board can be interrogated from the control computer in order to determine the actuator and LVDT positions at any point in time.

There has thus been shown a focus control system for focusing a stretched-membrane mirror module that accurately and quickly alters the plenum pressure so as to either alter the curvature of the front membrane, or maintain the curvature of the front membrane under transient environmental effects, and hence the focal length of the reflective surface formed by the front membrane. This change in plenum pressure is realized without requiring the movement of large amounts of air, or an equivalent fluid, into or out of the plenum space. Such change in plenum pressure is quickly and accurately realized by axially modulating the rear membrane. This approach not only allows for accurate focusing, but also provides for the quick and efficient defocusing of the system. Also, through the use of an easily controlled vent valve and control logic, the system can readily compensate for changes in internal plenum pressure caused by leaks and changes in outside temperature, and can automatically change the plenum pressure as required in order to center operating range (neutral point) of the device used to modulate the rear membrane about a desired focal length. All of these features advantageously combine to provide a rear membrane modulated focus control system wherein the focused image remains virtually unaltered even in the presence of substantial and randomly oriented transient wind forces.

It is noted that the present invention is particularly adapted for use in a heliostat, a point focusing dish, a parabolic trough type of solar radiation concentrator, or any other stretched-membrane device where the curvature of one membrane is controlled by the pressure differential between an internal plenum pressure and an external pressure.

While the invention described herein has been described with reference to a particular embodiment and application thereof, numerous variations and modifications could be made thereto by those skilled in the art without departing from the spirit and scope of the invention as claimed.

What is claimed is:

1. Apparatus for setting and maintaining the focus of a stretched-membrane mirror module, said mirror module including spaced apart membranes stretched between a perimeter support defining a closed plenum space therebetween, said perimeter support being oriented relative to a reference plane, a first of said membranes having a reflective coating thereon that reflects energy incident thereon to a focal point determined by the curvature of said first membrane relative to said reference plane, said apparatus comprising:
   means for inserting a mass of fluid into said closed plenum space at a first pressure, said first pressure causing said first membrane to assume a first curvature relative to said reference plane when in equilibrium with atmospheric pressure; and
   means for controllably changing the volume of said plenum space without changing the mass of fluid in said closed plenum space;
   said changed plenum volume causing said first pressure to change to a second pressure, said second pressure causing said first membrane to alter its curvature relative to said reference plane when in equilibrium with atmospheric pressure, thereby causing the focal point of said first membrane to change.

2. Apparatus as set forth in claim 1 wherein said means for changing said plenum volume comprises means for moving said second membrane relative to said reference plane.

3. Apparatus as set forth in claim 2 wherein said means for moving said second membrane includes:
   an attachment plate secured to said second membrane intermediate said perimeter support, and
   actuator means coupled to said attachment plate for moving said plate in and out relative to said reference plane.

4. Apparatus as set forth in claim 3 further including:
   means for measuring the transverse distance of a reference point on said first membrane from said reference plane;
   comparison means coupled to said measurement means for comparing said transverse distance relative to a specified distance; and
   drive means responsive to said comparison means for automatically causing said actuator means to move said attachment plate in a direction that causes the curvature of said first membrane to change in a way that minimizes the difference between said transverse distance measured by said measuring means and said specified distance.

5. Apparatus as set forth in claim 4 wherein said actuator means includes a plunger arm attached to said plate having a stroke distance that extends from a maximum retracted position to a maximum extended position, and wherein said apparatus further includes:
   means for generating a first adjustment signal if said arm reaches its maximum extended position or its maximum retracted position; and
   means responsive to said first adjustment signal for activating said fluid mass inserting means so as to insert an additional mass of fluid into said plenum space, or remove mass from said plenum space, and for readjusting said plunger arm to a position intermediate said maximum extended and retracted positions.

6. Apparatus as set forth in claim 5 wherein said mass of fluid inserted into said plenum space comprises a mass of gas, and wherein said means for inserting said mass of gas into said plenum space comprises a valve in fluid communication with said plenum space and a source of said gas, said valve being responsive to said first adjustment signal.

7. Apparatus as set forth in claim 5 further including means for moving said plunger arm of said actuator means to a defocus position in response to a defocus signal, said defocus signal being generated by said drive means in response to an external defocus command.

8. Apparatus as set forth in claim 7 wherein said apparatus operates from a source of line power, and further including means for automatically driving said plunger arm to said defocus position in the event of an interruption in said line power.

9. Focusing apparatus comprising:
   first and second spaced apart membranes supported between a perimeter frame, the space between said membranes and frame comprising a closed volume, said closed volume having a mass of fluid at a first pressure therein, said first membrane being coated with a reflective coating, said first membrane assuming a first curvature relative to a reference plane associated with said perimeter frame as a function of the pressure differential between said first pressure and a second pressure external to said volume; and
   means for controllably moving a section of said second membrane intermediate said perimeter frame in a direction substantially perpendicular to said reference plane without changing the mass of fluid in said closed volume, said movement causing said closed volume to change, said changed volume altering the pressure differential between said first and second pressures, said altered pressure differential changing the curvature of said first membrane so as to change the focal length of the reflective coating of said first membrane.

10. Focusing apparatus as set forth in claim 9 wherein said means for controllably moving a section of said second membrane comprises:
an actuator coupled to a section of said second membrane intermediate said perimeter frame, said actuator having means for moving said section of said second membrane in a direction substantially perpendicular to said reference plane;
control means attached to said actuator for controlling said actuator in response to an error signal; and
sensing means for measuring the position of said front membrane relative to said reference plane and for generating said error signal as a function of the difference between said measured position and a specified position.

11. Focusing apparatus as set forth in claim 10 further including means for automatically forcing said actuator to a defocus position in response to the occurrence of a prescribed condition, said defocus position causing the curvature of the focal point of said front membrane to change to a benign position.

12. Focusing apparatus as set forth in claim 11 wherein said automatic defocusing means performs its defocusing function without requiring any line power.

13. Focusing apparatus as set forth in claim 12 wherein said automatic defocusing means performs its defocusing function is a time interval that is less than 5 seconds.

14. Focusing apparatus as set forth in claim 10 further including means for automatically changing the amount of fluid in said closed volume in order to compensate for leakage of said fluid, or changes in the temperature of said fluid, thereby automatically adjusting said first pressure.

15. Apparatus for focusing a stretched-membrane mirror module, said mirror module including spaced apart membranes stretched between a perimeter support defining a closed plenum space therebetween, said perimeter support having a reference plane associated therewith, a first of said membranes having a reflective coating thereon, the curvature of said first membrane relative to said reference plane determining a focal length of said mirror module, said apparatus comprising:
plenum pressure adjustment means for selectively adjusting the pressure internal to said closed plenum space, said pressure adjustment means including means for placing a mass of fluid within said closed plenum space and means for selectively altering the volume of said space without changing the mass of fluid therein, thereby adjusting the pressure internal to said plenum space;
front membrane position measurement means for measuring the position of said front membrane relative to said reference plane, said position providing an indication of the curvature of said front membrane and hence the focal length of said mirror module at any given time; and
control means for determining the difference between the measured position of said front membrane relative to said reference plane and a specified membrane position, and for changing the volume of said plenum space by an amount that causes the pressure differential between the internal plenum pressure and an external plenum pressure to move said front membrane so as to minimize the difference between the measured position and the specified position.

16. A method of focusing a stretched-membrane mirror module, said mirror module including spaced apart front and rear membranes supported between a perimeter frame referenced to a reference plane, said spaced apart membranes and frame defining a closed space therebetween, said front membrane having a reflective coating thereon from which radiation reflects to point at a focal length therefrom determined by the curvature of said front membrane relative to said reference plane, said method comprising the steps of:
(a) filling said closed space with a mass of fluid until a first pressure is realized in said space, the pressure differential between said first pressure and a pressure external to said space causing said front membrane to assume a first curvature relative to said reference plane; and
(b) changing the volume of said closed space without changing the mass of fluid therein as required in order to alter said focal length, a change in the volume of said space without a change in fluid mass therein causing said first pressure internal to said space to also change, thereby altering the pressure differential, which altered pressure differential causes the curvature of said front membrane to change so as to change said focal length.

17. The method as set forth in claim 16 wherein step (a) comprises inserting a mass of air into said closed space by opening a vent while the volume of said space is being changed, said vent being in fluid communication with said closed space and with the atmosphere.

18. The method as set forth in claim 16 wherein step (b) comprises moving said rear membrane relative to said reference plane.

19. The method as set forth in claim 18 wherein said rear membrane is moved by pulling or pushing a centrally located section of said rear membrane in a direction substantially perpendicular to said reference plane.

20. The method as set forth in claim 19 further including the steps of
(1) monitoring the distance between a reference point on said front membrane and said reference plane as said rear membrane is moved, and
(2) stopping the movement of said rear membrane as soon as the distance monitored in step (1) is within a specified range of a first prescribed distance, said first prescribed distance coinciding with a first curvature of said front membrane that causes a specified focal length to be achieved.

* * * * *